May 19, 1959  R. M. AHONEN  2,887,143
METAL STRETCH BENDING APPARATUS
Filed Dec. 24, 1956  10 Sheets-Sheet 1

INVENTOR.
RAYMOND M. AHONEN
BY
ATTORNEY.

INVENTOR.
RAYMOND M. AHONEN
BY
ATTORNEY.

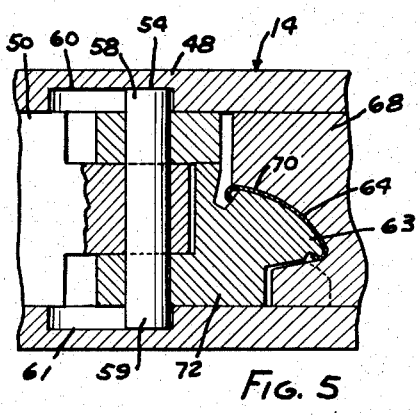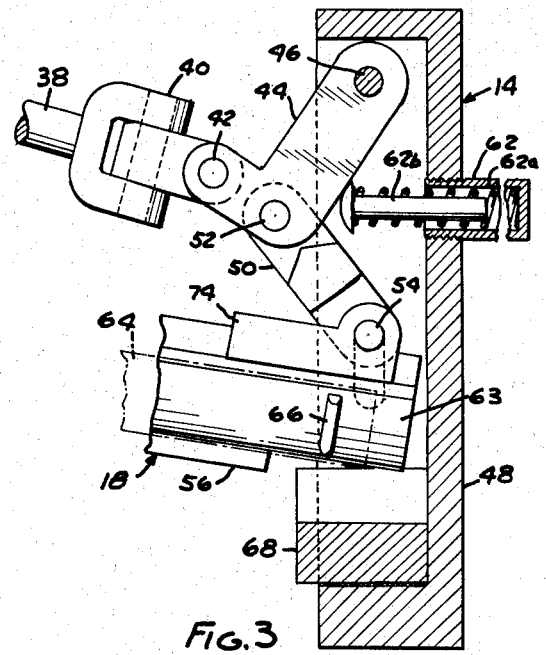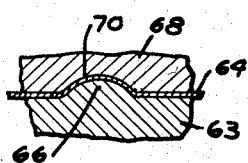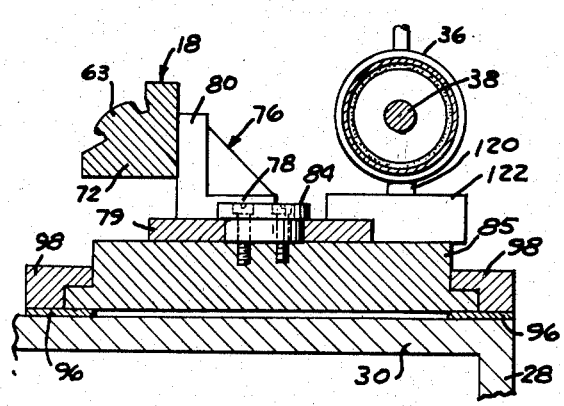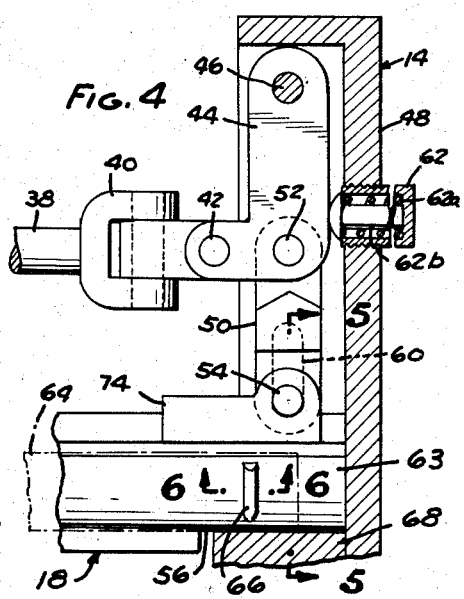

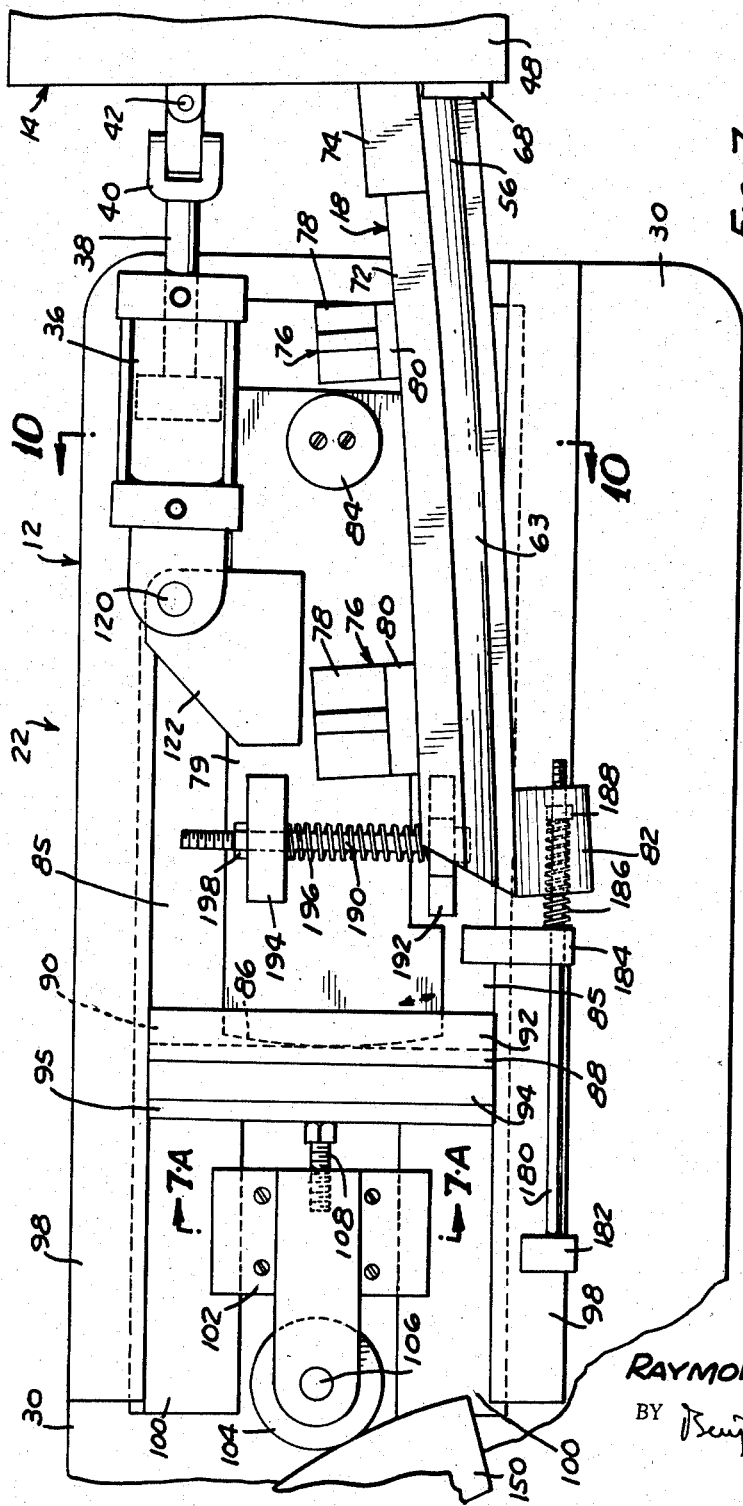

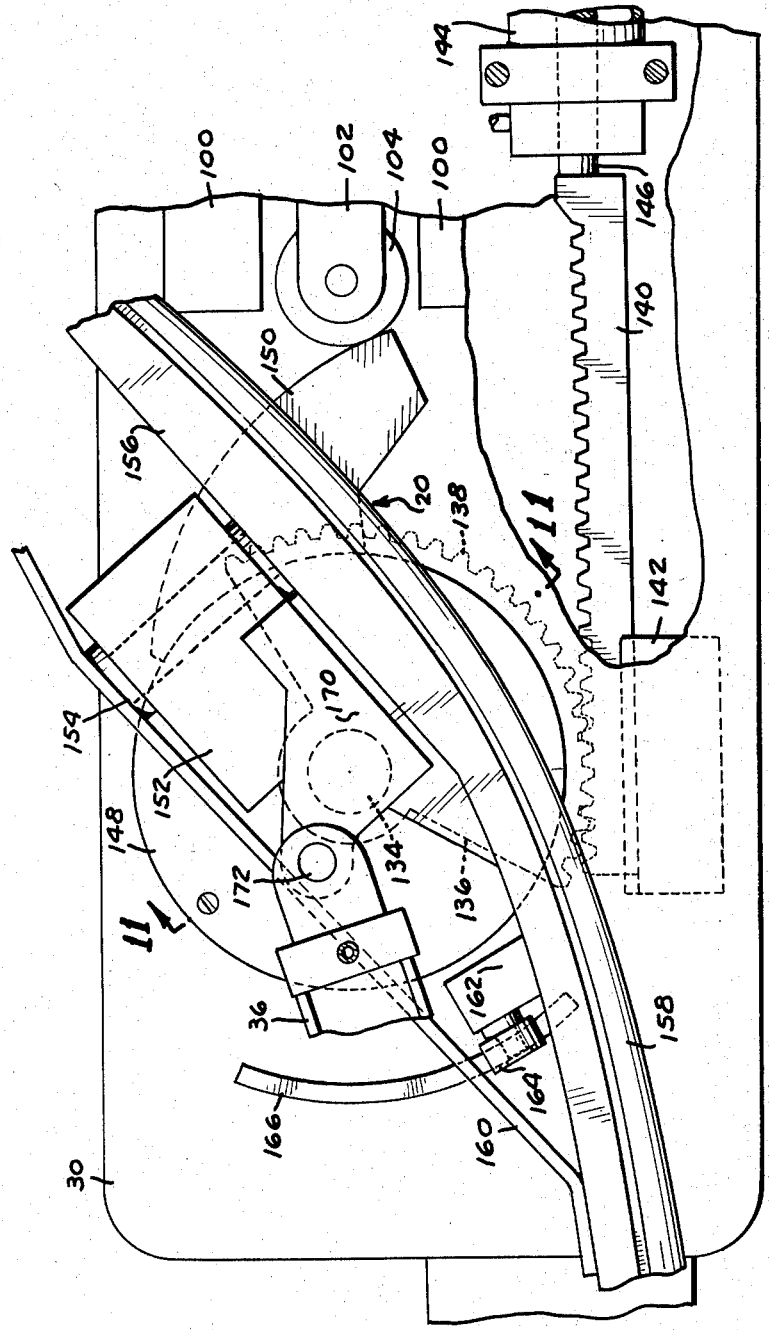

May 19, 1959 R. M. AHONEN 2,887,143
METAL STRETCH BENDING APPARATUS
Filed Dec. 24, 1956 10 Sheets-Sheet 7

INVENTOR.
RAYMOND M. AHONEN
BY
ATTORNEY.

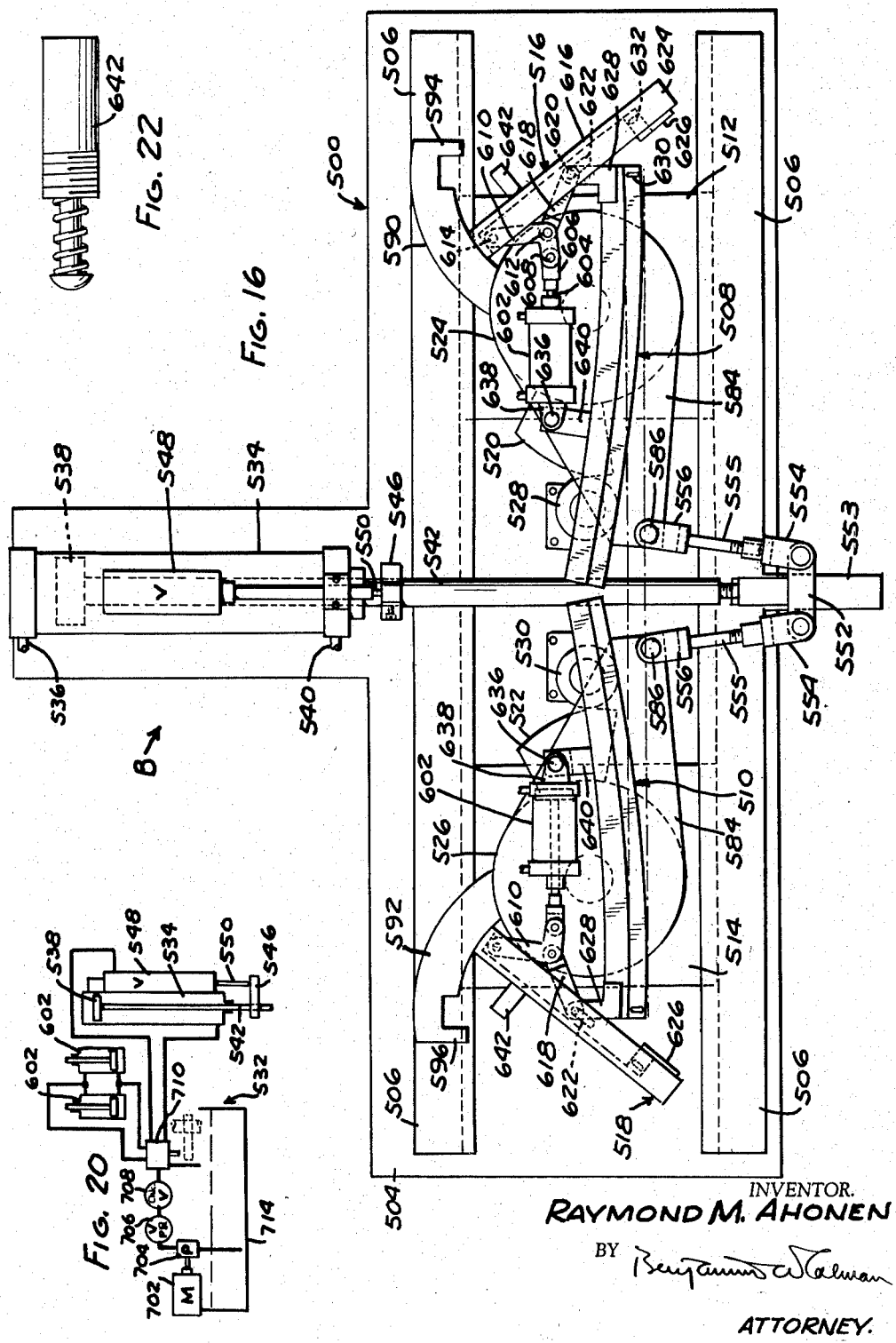

May 19, 1959 R. M. AHONEN 2,887,143
METAL STRETCH BENDING APPARATUS
Filed Dec. 24, 1956 10 Sheets-Sheet 9
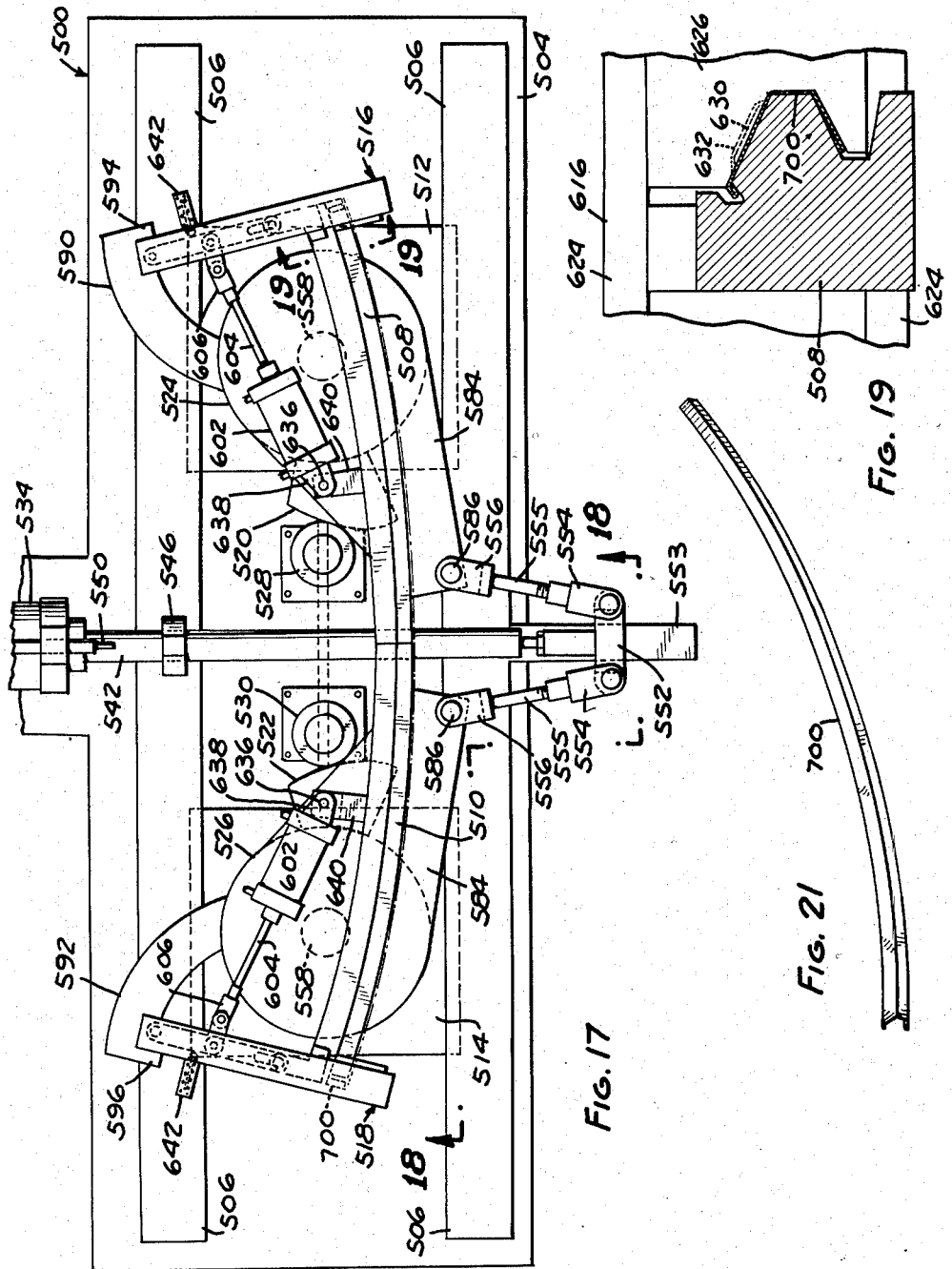
INVENTOR.
RAYMOND M. AHONEN
BY Benjamin Wachman
ATTORNEY.

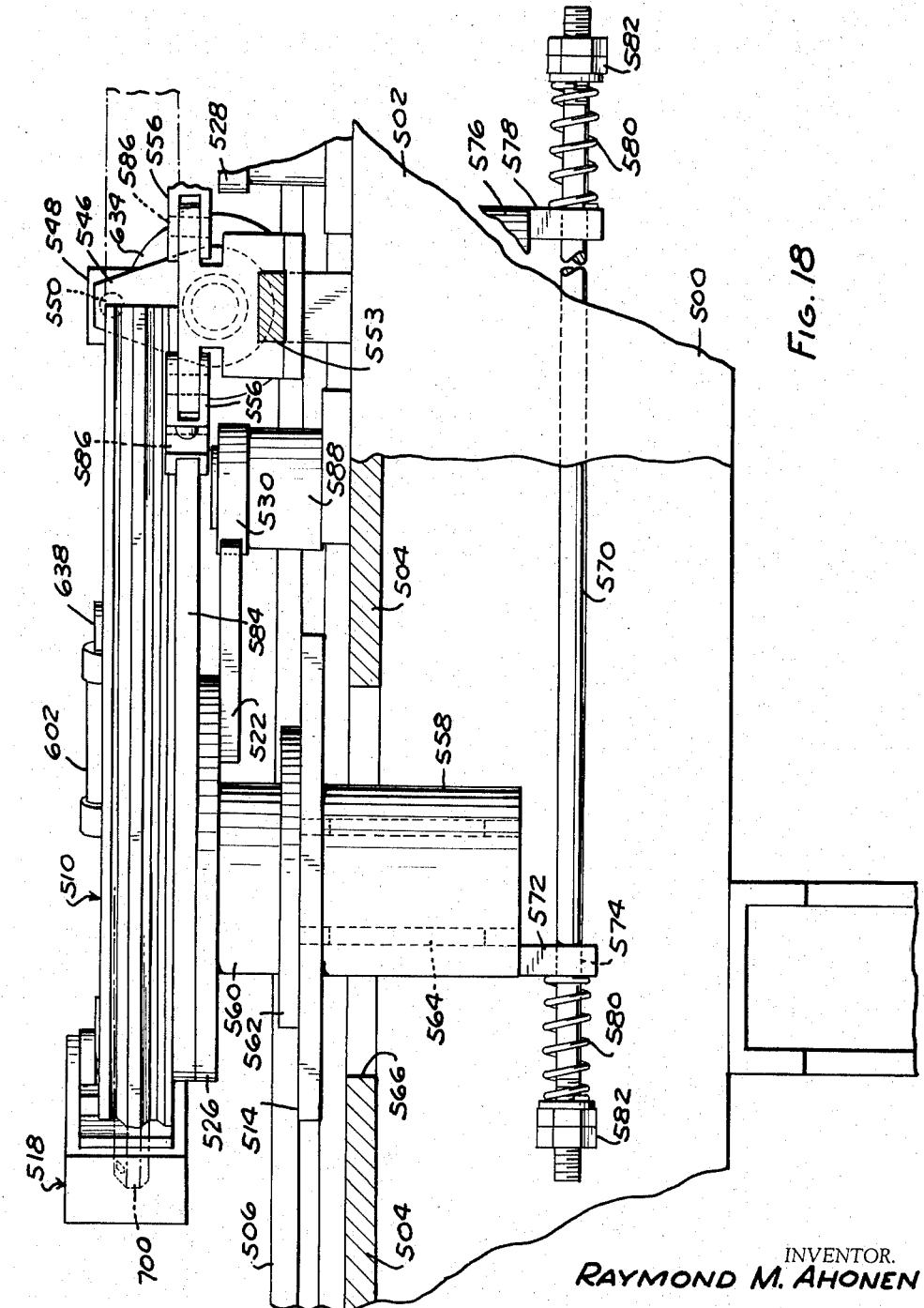

United States Patent Office 2,887,143
Patented May 19, 1959

2,887,143

METAL STRETCH BENDING APPARATUS

Raymond M. Ahonen, Southfield Township, Oakland County, Mich., assignor to Century Die & Manufacturing Company, Hazel Park, Mich., a copartnership Application December 24, 1956, Serial No. 630,164

17 Claims. (Cl. 153—40)

This invention relates to metal stretch bending apparatus and more particularly to apparatus for stretch bending a flat or semi-formed band or strip of metal into a curved finished form about die forms arranged on complementary die segments.

In general, the apparatus involves a forming die of curved configuration, clamps associated with the die at each end thereof to hold the ends of a flat or semi-formed metal band or strip, and a free-floating, cam controlled movement of the die in the stretch bending operation when the finished curved form is achieved. In one embodiment, the apparatus is preferably further provided with a motor driven hydraulic system, valve controlled to open and close the metal band holding clamps and to drive or actuate movement of the die segments. The metal stretch bending die is preferably formed in two segments, linked by the apparatus to close together in the fully expanded position and to separate in the initial open position so that the distance between the outer ends of the die segments is less than the distance between these ends when the die is in its fully expanded position.

The invention may take the form of a single bend machine or a double bend machine. In the single bend machine, the drive is applied directly to a single die segment. The double bend machine employs a drive applied to both die segments simultaneously and substantially equally.

A preferred embodiment of the invention includes freely moving, sliding, guided, cam controlled, hydraulically actuated die blocks. These die blocks support the die segments which, in the case of the single bend machine, rotate in a horizontal plane and in a compound plane, and in the case of the double bend machine, rotate in a horizontal plane. It will be noted in the description of the invention given below that the apparatus is so constructed as to provide for rotative movement of both die segments in compound planes if desired or required.

It should be understood that the apparatus of this invention is primarily designed to stretch bend a straight flat or semi-formed metal band or strip into a curved form.

It is an object of the invention to provide in a stretch bending apparatus at least one freely moving, sliding, guided, cam-controlled die block actuated hydraulically, mechanically, or by any other suitable means. It is another object to provide metal strip or band clamping mechanism on each die segment of a stretch bending die. It is a further object to associate such clamping means at the outer ends of the die segments as a part of the die segment assembly, directly and cooperatively coupled therewith. It is still another object to associate a pair of die segments, either or both of which are mounted on cam-controlled, guided, freely moving, sliding die supports or blocks for stretch bending a metal band or strip, the metal band serving to hold the die segments and their supporting die blocks together during the stretch bending operational stage.

These and other objects of the invention and features of construction will become more apparent from the description given below. The description together with the appended drawing is a disclosure of preferred forms which the invention may take, and is not intended to be a limitation of the forms and variations which persons skilled in the art may make. For a visual understanding of the invention, reference is made to the accompanying drawing, in which—

Fig. 3 is a plan view, partially in section, of the clamping mechanism associatedly conjoined with one of the die segments, the clamp being arranged in open position.

Fig. 4 is a plan view, also partially in section, of the clamping mechanism of Fig. 3, showing the clamp in closed position over the metal band, in dotted lines.

Figs. 5 and 6 are fragmentary substantially vertical sectional views, taken on the lines 5—5 and 6—6 in Fig. 4.

Figure 1:
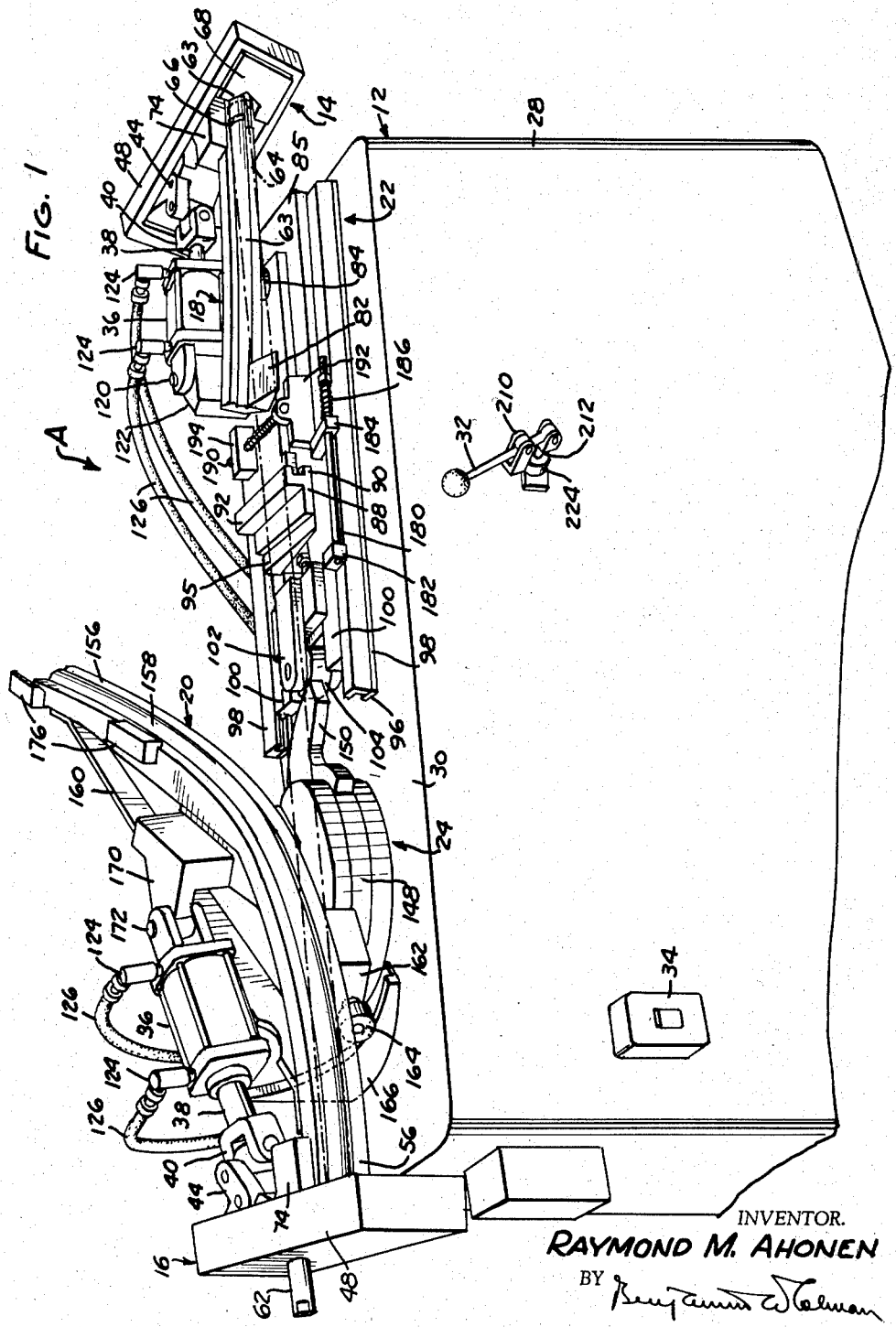
Fig. 1 is a perspective view of a single bend machine, showing the apparatus in which the metal band is stretch formed, the machine being in open machine position, ready for insertion of the metal band shown in dotted lines.

Fig. 7 is a fragmentary plan view of the right end of the single bend machine of Fig. 1, with the die segment and clamp in expanded closed position.

Fig. 7a is a vertical sectional view taken substantially on the line 7a—7a of Fig. 7.

Fig. 8 is a fragmentary plan view of the left end of the machine shown in Fig. 1, with parts broken away to show some of the actuating mechanism, the die segment being arranged in open pre-clamping position.

Figure 9:
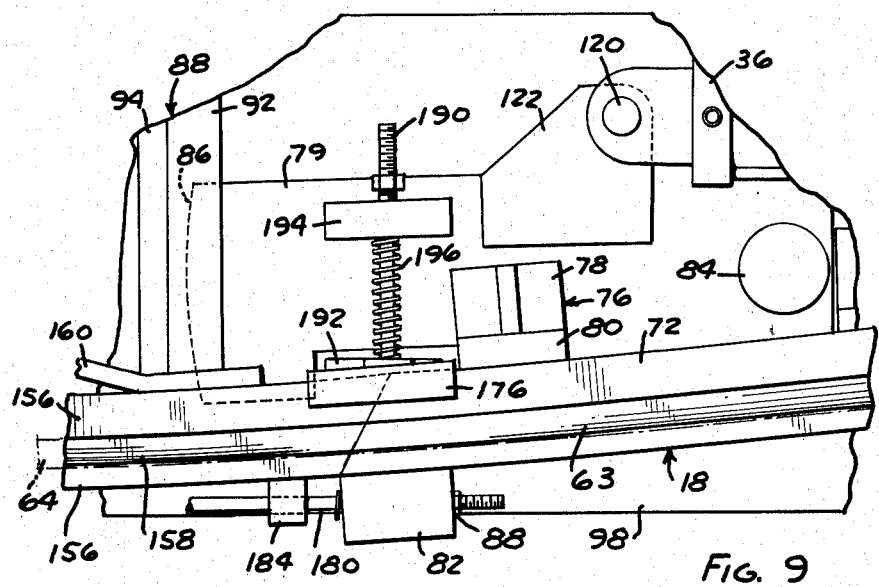

Fig. 9 is a fragmentary plan view of the center joint of the two die segments of the single bend machine of Fig. 1, after stretch bending the semi-formed metal band to expanded die shape.

Fig. 10 is a vertical sectional view taken substantially on the line 10—10 of Fig. 7.

Figure 11:
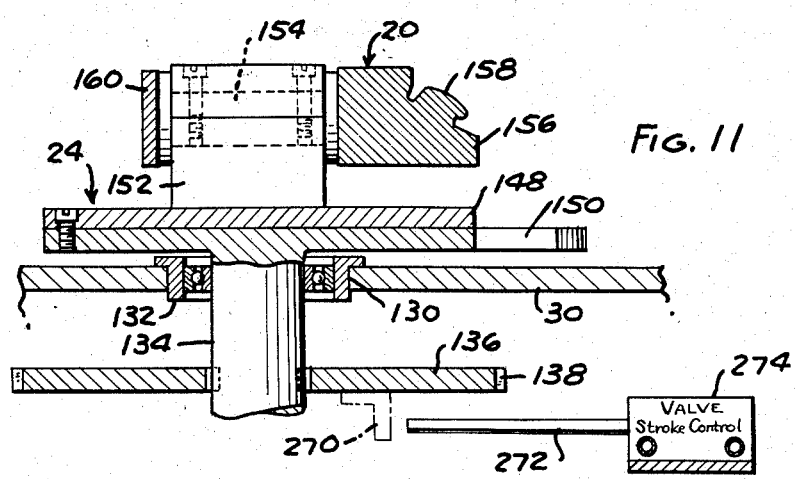

Fig. 11 is a vertical sectional view taken substantially on the line 11—11 of Fig. 8.

Figure 12:
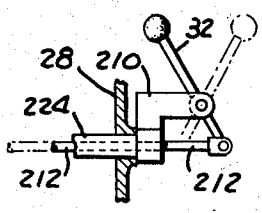

Fig. 12 is a fragmentary vertical side elevation, partially in section, showing the hydraulic valve control in starting position in full lines, and in actuating position in dotted lines.

Figure 13:
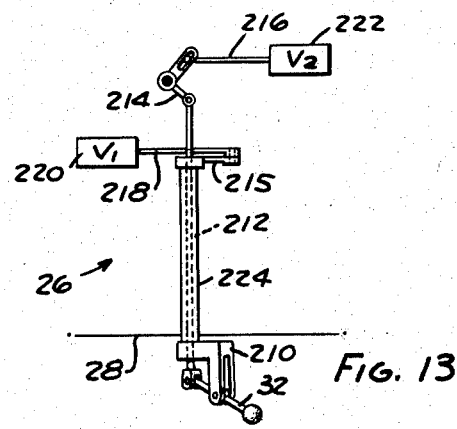

Fig. 13 is a plan diagrammatic view of the hydraulic valve control for the hydraulic system.

Figure 14:
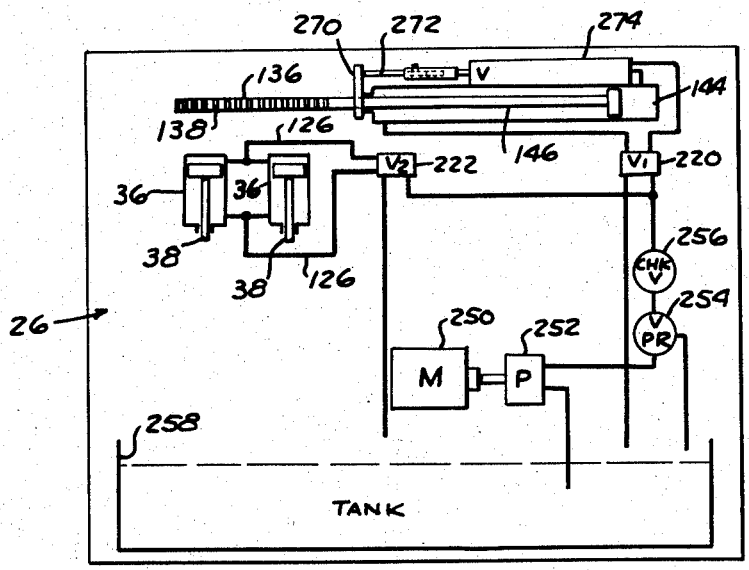

Fig. 14 is a diagrammatic outline of the hydraulic system for the single bend machine of Fig. 1.

Figure 15:
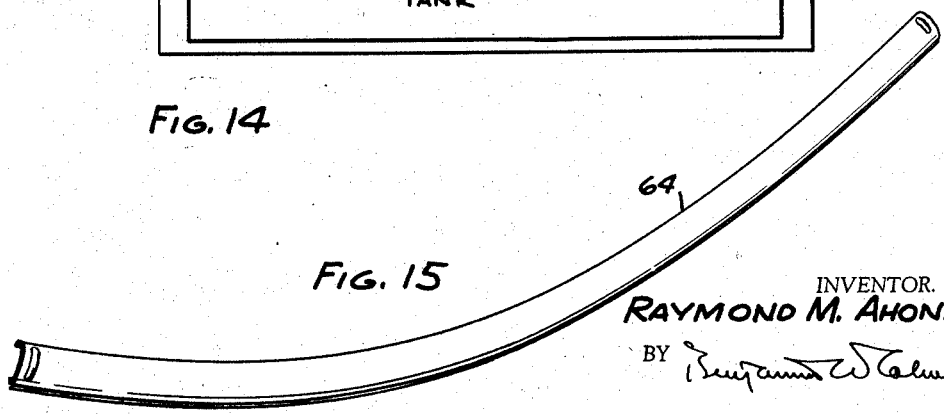

Fig. 15 is a perspective view of the finished curved metal band, stretch formed on the single bend machine of Fig. 1.

Fig. 16 is a top plan view of the double bend machine embodying the invention, with the die segments in retracted position and the metal band holding clamps in open position.

Fig. 17 is a top plan view of the double bend machine of Fig. 16, showing the die in expanded position.

Fig. 18 is a fragmentary enlarged front elevational view of the left hand portion of the double bend machine of Fig. 16, with parts broken away to show a portion of the apparatus below the top plate in section.

Fig. 19 is a fragmentary enlarged vertical sectional view substantially on the line 19—19 of Fig. 17.

Fig. 20 is a diagrammatic outline of the hydraulic system for the double bend machine of Fig. 16.

Fig. 21 is a perspective view of the finished curved metal band, stretch formed and bent on the double bend machine of Fig. 16.

Fig. 22 is an enlarged side elevation of an element of the clamp mechanism employed in the apparati.

As shown in Figs. 1 through 15 inclusive, the single bend machine 10 embodying the invention, designated as "A" in Fig. 1, comprises a base support 12, metal strip or band clamping mechanisms 14 and 16, right and left respectively, die segments 18 and 20, right and left respectively, die support or bearing mechanisms 22 and 24, right and left respectively, mounted on base 12, and a hydraulic actuating and control mechanism designated generally as 26 (Figs. 12, 13 and 14).

Base 12 is of metal construction, being formed of steel walls 28 and a top plate 30 supporting the die bearing mechanisms 22 and 24. Mounted on the wall 28 at the front of the machine 10, in the preferred operating position, is the manual control lever 32. A power supply "on-off" switch 34 is also mounted on the front wall 28 in easily accessible position for the operator.

The two band clamping mechanisms 14 and 16 are preferred forms of metal band holding devices which may be used to grip the two ends of a flat or semi-formed straight metal band prior to stretch bending the band upon the die. It will, of course, be understood that the employment of the clamping mechanisms 14 and 16 is optional and that other means may be used without in any way modifying or qualifying the invention herein disclosed.

The clamping mechanisms 14 and 16 are right and left respectively. Their construction is identical as to details, which are arranged in inverse, opposed relationship. It is therefore not considered necessary to describe each clamping mechanism in detail, and a description of the right hand clamping mechanism 14 will serve adequately as a disclosure of both mechanisms 14 and 16, for persons skilled in the art to which the invention pertains.

Clamping mechanism 14 comprises a hydraulic piston type cylinder 36 having a piston rod 38 projecting from the cylinder, at the end of which is affixed a joint 40. Coupled to the joint at pivot 42 is a bell crank 44. The other end of the bell crank is pivotally mounted at pin 46 to the outer wall of clamp housing 48. A linking lever 50 is connected at 52 to the center pin of bell crank 44. The opposite end of lever 50 is pin connected at 54 to the outer end 56 of die segment 18. The upper and lower ends 58, 59 of pin 54 are freely slidable in the clamp housing slots 60, 61 respectively.

Supported in the outer wall of clamp housing 48 is a blind hole, cylindrical member 62 containing a coiled helical spring 62a and a headed plunger rod 62b concentrically arranged within the spring which constantly urges the plunger rod 62b against the bell crank 44 adjacent the link pivot pin 52.

The die segment end 56 is provided with a metal band die form or support portion 63 upon which the right (or left) end of the metal band or strip 64 is placed for clamping and holding. To provide a positive grip on the end of band 64, an embossment 66 is provided on the die form or support portion 63, substantially transverse to the direction of stretch bending the metal band. A clamp bar 68 arranged in the forward end of clamp housing 48 is provided with a recess 70 to complement the embossment 66 over the metal band 64.

The metal band 64 is shown as semi-formed and having a channelled, lipped cross-section as shown in Fig. 5. Such a form is preferably roll-formed from a flat strip of metal, although other methods may also be used. In the straight channel form, the metal band 64 is ready for insertion into the clamping ends of the machine "A." It will, of course, be understood that a flat metal strip may also be stretch bent upon the apparati here shown and described.

As shown more clearly in Figs. 7 and 10, die segment 18 at the right side of machine 10 comprises a base portion 72 on which is longitudinally arranged, integrally or otherwise, the metal band die form or support portion 63 which contains the configuration to which the band 64 will be stretch formed. At the die segment end portion 56, a plate element 74 is fixedly mounted thereto and linked to the clamp lever 50 by pin 54, so that the clamping mechanism 14 is pivotally linked by pin 54 to the die segment 18.

Adjacent the inner and outer ends of the die segment base portion 72 are support members 76 affixed at their bases 78 to the die bearing plate 79 and at their upright elements 80 to the die segment base portion 72. Affixed on the forward side of base portion 72 and at its inner end is a slide pad 82 designed as a slide rest for band 64, so that the metal band will not become positionally displaced with respect to the band die form 63 as the die segments are actuated and closed together.

Adjacent the clamping mechanism 14, at the right side of the machine 10, the die bearing plate 79 is pivotally mounted at pivot 84 on the die slide block 85. The inner end 86 of die bearing plate 79 is slidingly supported on slide guide block 88. It will be noted that the end 86 of plate 79 is curved. The curvature is a portion of the circular arc struck by using the vertical axis of pivot 84 as the center, the distance therefrom to the plate end 86 being the radius of curvature. Slide guide block 88 is provided with a plate bearing portion 90 and an overhang 92 forming a sliding guide slot for the plate end 86. The block 88 is mounted by flange 94 upon the wedge plate 95, resulting in an angular sliding rotative movement of die bearing plate 79. As shown in Fig. 10, die slide block 85 is slidingly arranged on wear plates 96 mounted on machine top plate 30, within the gibs 98.

Forward of slide guide block 88, die slide block 85 is arranged with arms 100 about which is mounted a pair of plate members 102 supporting a cam follower 104 about its pin 106. An adjusting screw 108 is threaded into one of the plate members 102 for adjusting the location of the cam follower 104. The head of adjusting screw 108 bears against wedge plate 95.

Clamping cylinder 36 is rotatably mounted on a pin 120 set in a block 122 fixedly mounted on die bearing plate 79. At each end of cylinder 36 are inlet fittings 124 for hydraulic conduit 126 leading from a valve to be more specifically described below.

The left hand portion of the single machine 10 is substantially shown in Figs. 8 and 11, the die segment 20 being shown in open position. Metal band clamping mechanism 16, being a duplicate of mechanism 14, is not shown, but it will be understood as being arranged and mounted similarly to the construction above described for mechanism 14.

Machine top plate 30 is provided with an opening 130 in which is seated a bearing 132 vertically supporting a die block support shaft 134. Horizontally and fixedly mounted about the lower end of shaft 134 is a gear plate 136 having gear teeth 138 arranged to mesh with a rack 140 hydraulically driven in a guide 142 by a hydraulic cylinder 144 and its piston rod 146.

Supported on shaft 134 is a plate member 148 having a cam 150 fixedly mounted at the edge thereof. Cam 150 is disposed horizontally in a plane that coincides substantially with the plane of cam follower 104.

Fixedly supported and mounted on plate member 148 adjacent one edge thereof is a block member 152 in which is horizontally disposed a rotatable horizontal pivot pin 154, on the forward end of which is fixedly mounted one end of die segment 20. The block member 152 is arranged as a bearing for pivot pin 154 so that die segment 20 is freely rotatable in a vertical plane.

Die segment 20 comprises a base portion 156 and a band die form or support portion 158, having the configuration of the finished curved portion of the left hand end of the metal band 64. A support strip or arm 160 is fixedly attached at each end thereof to the die segment base 156, and centrally to the pivot pin 154, as additional load bearing aid. Adjacent the outer end of die segment 20 and affixed to the base portion 156 thereof is a cam follower mount 162 on which is horizontally and rotatably arranged a cam follower 164. A vertical cam 166 is mounted on the machine top plate 30, upon which cam the follower 164 rides to swing the die segment 20 in a vertical plane about the horizontal pivot pin 154.

A support mount 170 for clamping cylinder 36 is arranged on plate member 148, having at its outer end a pin 172 upon which cylinder 36 can pivot rotatably so as to adjust to the swinging action of clamp mechanism 16.

Disposed on die segment base portion 156 at the inner end of the die segment are one or more stop members 176 to limit the upward travel of the metal band 64 on the band die form 158.

An adjusting screw pin 180 is supported in mounts 182 and 184, the first of which is fixedly mounted on the gib 98, the second being mounted on the slide block 85 rearwardly of the first. A coiled helical spring 186 is held on the screw pin 180 by a nut 188. Pin 180 is fixedly held by the first mount 182, so that outward movement of the slide block 85 is cushioned and retarded. A second cushioning and retarding mechanism transversely arranged is the pin 190 which is supported in mounts 192 and 194, the first of which is fixedly arranged on slide block 85 and the second of which is attached to die bearing plate 79. A coiled helical spring 196 is arranged about pin 190 intermediate the mounts 192 and 194, and a nut 198 holds the pin adjustably in its mounts. The forward end of pin 190 is fixedly attached to mount 192. Thus, the movement of die segment 18 into open position, i.e. for insertion of the straight metal band 64, is aided by the spring 196, while the advance of the die segment 18 into its fully expanded position is cushioned and retarded. Adjustments of the nut 188 on pin 180 and nut 198 on pin 190 limit the movement of the springs 186 and 196 respectively, to provide the desired retardation and cushioning action.

The hydraulic and control mechanism 26 shown in Figs. 12, 13 and 14 comprise the pivoting control lever 32, its rotatable yoke type support 210, a shift lever 212 linked to one end of the lever 32, and linkage 214, 215 connected to valve control rods 216 and 218 for control valves 220 and 222 respectively. A tubular support 224 for shift lever 212 is mounted in an opening in the machine base wall 28, the support 224 being fixedly attached to the support 210 so as to rotate with the support, moving linkage 215 for actuation of valve control rod 218.

The hydraulic system of the single bend machine 10 comprises a motor 250 driving a hydraulic fluid pump 252 which feeds fluid through suitable conduits to a pressure regulator valve 254, a check valve 256, and the two principal control valves 220 and 222, which may be combined as a four-way valve. The pump 252 is supplied with hydraulic fluid from a tank 258 into which the fluid may be discharged from exhaust ports in the pressure regulator valve 254 and the two control valves 220 and 222.

Control valve 220 operates to pass hydraulic fluid to the master cylinder 144, wherein the piston rod 146 advances or retreats to rotatably move the gearing 136 by means of the rack 140. A stop or limiting block 270 is adjustably mounted on the gear 136 to make contact with a control rod 272 in limiting valve 274. Thus, the flow of hydraulic fluid is from control valve 220, through the limiting valve 274 to the master cylinder 144.

Control valve 222 is operated by hydraulic fluid from the check valve 256 to actuate the clamping cylinders 36.

The single bend machine 10 of Figs. 1-15, inclusive, is put into operation by manually closing the switch 34 which passes current to the motor 250. The pump 252 thereupon charges the hydraulic system 26 with fluid taken from tank 258, passing the same to the valves 220 and 222. The manual control lever 32 is initially in its clamp-open, die-open position, with the hand knob of the lever at the upper left and close to wall 28 of the machine base. This position is shown in Fig. 1.

A semi-formed, channelled metal band or strip 64, longitudinally straight, is put into the machine by placing the ends of the strip on the die segment die form portions 63 and 158 over the embossments 66, at the outer ends 56 of the die segments 18 and 20. It will be observed, as shown in Fig. 1, that the inner end of die segments 18 and 20 are turned away rearwardly from each other, upon their respective pivots 84 and 134, foreshortening the distance between the outer ends of the die segments.

The clamps 14 and 16 are then closed over the outer ends of the metal band 64 by pivoting the control lever 32 forwardly toward the operator, but not rotating the lever to the right or left. The lever movement opens the valve 222 to charge the cylinders 36 with hydraulic fluid, forcing the piston rod 38 against the bell crank 44, which slides the clamp bar 68 upon the die segment end 56. The embossment 66 and the recess 70 close upon the ends of the metal band 64, forcing the embossment into the metal band to provide a positive grip thereupon. It will also be noted that the clamp housing 48 brings the clamp bar 68 into position over the metal band and the bell crank 44 moves the die segment end 56 and the clamp 68 together.

Member 62, mounted outwardly of clamp housing 48, performs the function of causing the housing to swing inwardly toward and against end 56 of the die segment before the clamp bar 68 moves upon the metal strip 64 to lock it therewithin. And similarly when the clamp mechanism 14 is released, the movement of housing 48 is first substantially normal away from the die segment until pin 54 reaches the forward end of slots 60, 61, when it swings outwardly to open the die form for manual release and removal of the metal strip or band 64. Plunger 62b, by bearing against the crank 44, holds the pin 54 against the rearward end of slots 60, 61 (as in Fig. 3), until the clamp housing 48 swings fully around against the outer end of the die segment, before advancing the clamp bar 68 upon the die form 63. As the crank 44 closes further into housing 48, the clamp bar 68 moves upon the die form 63 and the link pin 54 slides forwardly in its slots 60, 61. Upon release, the first movement of clamp housing 48 is to slide the length of slots 60, 61 in a direction substantially normal to the die segment before pivoting outwardly away from the end of the die segment. It will, of course, be understood that swinging movement of the clamp bar 68 into the end of the metal strip or band 64, rather than upon it from the front, would result in damaging the end of the band 64, making it difficult, if not impossible, to properly grip the band for stretch bending.

It will be readily understood by persons skilled in the art to which this apparatus pertains that a variety of clamp or grip mechanisms may be employed, the example shown being a representative one.

When the metal band 64 is held at its ends by the clamp mechanisms 14 and 16, the control lever 32 is manually pivoted to the right, actuating valve 220 and charging the master cylinder control valve 274 and the master cylinder 144 with hydraulic fluid. As the master cylinder piston rod 146 moves outwardly of the cylinder, the rack 140 turns the gearing 136, horizontally rotating the die support or bearing mechanism 24 about its pivot shaft 134. The die segment 20 is thus caused to rotate in a vertical plane about the pivot shaft 154, the outer end portion of the die segment riding upward as cam follower 164 bears upon the cam 166.

The inner ends of the die segments 18 and 20 are brought into contiguous alignment by the metal band 64 which draws the cam follower 104 hard against the die bearing cam 150, Fig. 9. The function of cam 150 is to control the rate of advance to closing position of the two die segments and thus to control the rate and relationship of the stretch bending operation to the configuration of the die forms 63 and 158. As the inner ends of the die segments close in toward each other, the metal band slides over the slide pad 82 and underneath the stop members 176 to fit closely upon the die support portions 63 and 158.

Figure 2:
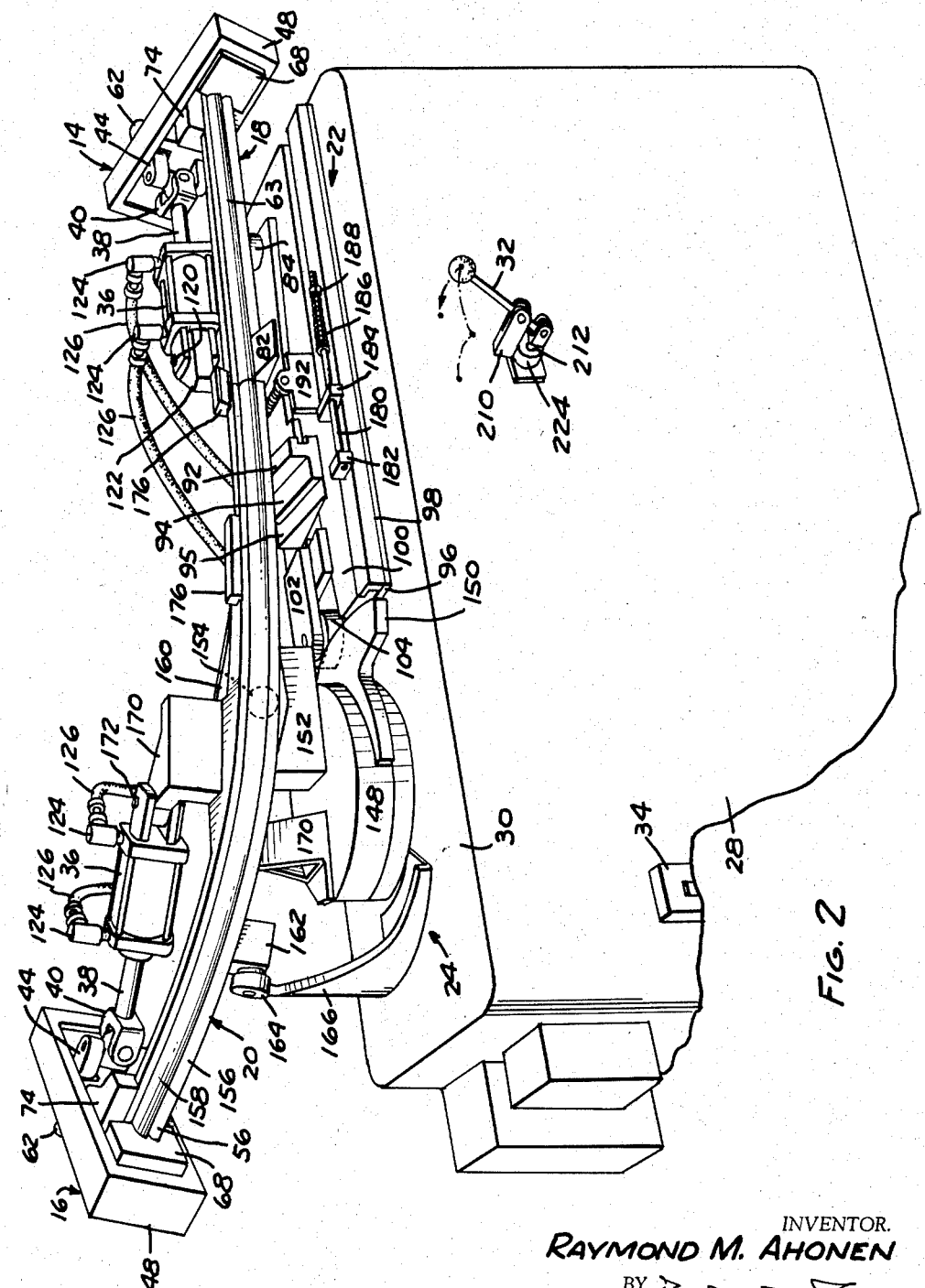
Fig. 2 is a perspective view of the machine of Fig. 1, showing the machine in fully closed position, the metal band having been stretch formed to full die shape.

It will be noted that the die segment 18 at the right in the single bend machine has no rotative drive of its own, but is dependent upon contact by the inner end of the left hand die segment 20 to swing it around into the forward predetermined final or stop position, as shown in Fig. 2, whereat the metal strip 64 is stretch bent into the full, finished configuration of the die forms 63 and 158. However, in certain applications, depending upon the nature and character of the finished form, a drive could be applied to the right hand die segment 18 that would swing it forwardly independently of the left hand die segment 20.

The right hand die bearing mechanism 22 provides for rotation of the die bearing plate 79 about its pivot 84, to bring the right hand die segment 18 into its closed position. The inner end 86 of the die bearing plate rotatingly slides upon the guide block 88 downwardly according to the angle of wedge block 95 until it reaches its forward limit.

The slide plate 85 moves in its gibs 98 under the influence of cam 150 as it bears on the cam follower 104, and as the metal band 64 is stretched and bent between the ends of the die segments 18 and 20 upon the die form or support portions 63 and 158.

When the two die segments 18 and 20 close together, as shown in Fig. 9, the initially straight semi-formed, channelled metal band 64 has been stretch formed beyond its elastic limit into the configuration shown in Fig. 15. The curvature of the metal band is compound in character, as required presently for such elements as the moldings on automobile wrap around windshields.

At this point in the operation of the apparatus, the product has been stretch formed and is ready for release. The operator pivots the control lever 32 rearwardly toward the machine base wall 28, operating the valve 222 and opening the clamp mechanisms 14 and 16. As the clamp housings 48 swing away from the outer ends 56 of the die segments 18 and 20, the stretch formed metal band 64 is ready to be picked up and manually removed from the die form or support portions 63 and 158, from which it slides easily.

Once the band 64 has been removed, the die segments 18 and 20 are moved to their initial starting positions by pivotally rotating the control lever 32 about the tubular support 224, causing the valve 220 to pass hydraulic fluid to the reversing end of the master cylinder 144, moving the piston rod 146 and its attached rack 140 rearwardly. The reverse movement of the rack against gear teeth 138 causes gearing 136 to rotate the pivot shaft 134 and its conjoined bearing plate 148.

The cam follower 164 rides down cam 166, die segment 20 pivots about its bearing 154, and the inner end of the die segment swings upwardly into starting position. At the same time, the right hand die bearing mechanism returns to its initial position under the urging of spring 196, so that the die segment 18 rotates inwardly and rearwardly about pivot 84.

The spring 186 urges the mount 184 forwardly to cushion the return movement of slide plate 85 as cam 150 rides against the cam follower 104, so that the right hand die bearing mechanism 22 is not driven too far to the right or beyond its initial starting position. A further control over the inertial reverse movement, for the left hand die bearing mechanism 24, is the master cylinder valve 274 which has the control rod 272 so positioned as to make positive engaging contact with a stop element 270 mounted on the gearing 136. As the gearing 136 rotates to its initial starting position under the drive of rack 140, the inertia of rotation may carry the die bearing mechanism 24 around to a point beyond the starting position. To counteract and control this inertial effect, the stop member 270 comes in contact with the valve rod 272 to actuate valve 274 so as to charge the master cylinder 144 at a predetermined point with fluid at its head end and thus bring the rearward movement of the piston rod and rack 140 to a positive stop at the desired initial starting position.

The metal band double bend machine "B" of this invention shown in Figs. 16–21, inclusive, includes a machine base support 500 having walls 502 and a top plate 504 integrally conjoined to form a suitable support for the stretch bending mechanism. On top plate 504 are two pairs of parallel slide guides or gibs 506, oppositely arranged, and in which the segmented stretch bending mechanism is slidingly mounted. This mechanism comprises a pair of linked die segments 508 and 510, right and left respectively, slide plates or die support mounts 512 and 514 on which the die segments 508 and 510 are respectively pivotally mounted, clamping mechanism 516 and 518 at the outer ends of the die segments 508 and 510 respectively, cams 520 and 522, right and left respectively, mounted on the circular die segment support plates 524 and 526, right and left respectively, and top plate mounted cam rollers or followers 528 and 530, right and left respectively. A hydraulic drive system, designated generally by the reference numeral 532, Fig. 20, operates the stretch bending mechanism of machine "B."

Machine base 500 is preferably arranged in a T-shape to provide suitable support for the hydraulic cylinder 534 mounted thereon rearwardly of the stretch bending mechanism. Cylinder 534 is of usual construction and includes an inlet conduit 536 at the rear end of the cylinder for hydraulic fluid to drive the piston 538 forwardly, and an inlet conduit 540 at the forward end of the cylinder for fluid to drive piston 538 rearwardly. Piston rod 542, connected to piston 538, projects forwardly of the cylinder and supports a block member 546 which is adjustably mounted on the rod. Fixedly mounted on cylinder 534, and above it, is the limiting control valve 548 having a forwardly projecting valve control rod 550 which is operatively actuated by the block member 546 as the latter comes into contact with it.

The function of control valve 548 is to limit the return movement of the piston rod, due to inertial energy, which might swing the clamping mechanism 516 and 518 too far outwardly from the die segments 508 and 510, and to bring the clamping mechanisms and die segments into a positive predetermined starting relationship. The control valve 548 accomplishes this function by closing off the hydraulic fluid in the system against entrance into the cylinder 534.

The elongated projecting piston rod 542 is arranged with a terminal cross member 552, which moves slidingly on a supporting guide member 553 mounted on top plate 504 and projecting slightly forward of the machine base 500. Pivotally connected by yokes 554 to cross member 552 at either end thereof are a pair of adjustable links 555 having yokes 556 affixed at their opposite ends.

In view of the symmetry of the stretch bending mechanism shown in the drawings for machine "B," it is deemed sufficient to describe in detail one of the two complementary portions of the mechanism, it being understood that the second portion is substantially identical in parts and conjoined arrangement except that the second portion is disposed in inverse relationship. The portion to be described in detail is located to the left of the piston rod 542, as shown particularly in Fig. 18.

As shown in Figs. 16–20, inclusive, the slide plate or die support mount 514 is slidingly mounted in guides or gibs 506, 506. Pivotally supported in a vertical bearing 558, on plate 514, is a hub 560 having a bearing flange 562 resting on plate 514 and a sleeve 564 rotatable in bearing 558. The machine base top plate 504 is cut out at 566 to allow for free oscillating movement of the bearing 558 therethrough, permitting the bearing to project below the top plate, where a rod 570 is slidingly mounted on the lower end of the bearing. At the lower extremity of bearing 558 is a rod bearing block 572 having an opening 574 through which rod 570 is freely slidable. The complementary second portion bearing 576, fragmentarily shown at the right in Fig. 18, has fixedly connected thereto its rod bearing block 578 to support the right end of rod 570. Arranged outboard of the blocks 572 and 578 are compression springs 580 held in operative engagement by nuts 582 threaded onto the ends of rod 570.

The circular die segment support plate 526 is fixedly conjoined to the hub 560 and provides the mount for attachment below of the cam 522, and for the attachment above of the lever plate 584, the inner end of which is pivotally linked at 586 to the yoke 556. Cam 522 is arranged to operatively bear on cam roller or follower 530, which is pivotally and rotatably mounted on pivot bearing 588 affixed to the machine base top plate 504.

Surmounted on lever plate 584 is the die segment 510, containing the die form of the configuration into which the metal strip is to be stretch bent, the outer end of which is link connected to the band clamping mechanism 518, a construction substantially identical to that described above for the single bend machine "A."

Affixed to the rearward edge of the circular die segment support plates 524 and 526 are the clamp limiting guides 590 and 592, respectively, which serve to limit the rotative movement of the clamp housings at the stops 594 and 596, as shown in Figs. 16 and 17.

The clamping mechanism 516 or 518, which is substantially identical with the clamping mechanism 14 and 16 of machine "A," comprises a hydraulic piston type cylinder 602 having a piston rod 604 projecting therefrom at the end of which is affixed the joint 606. Pivotally mounted at 608 on the end of the joint 606 is a bell crank 610 having a central pivot 612 and an end pivot 614 mounted in clamp housing 616. Linked at one end to pivot 612 is a lever 618 having a pivot 620 slidingly mounted in upper and lower slots 622 arranged in the upper and lower walls 624 of housing 616. At the forward end of the housing 616 is a clamping bar or anvil 626, designed to close over the end of a metal band laid upon the ends of the die segments 508 and 510. A linking member 628 is pivotally affixed at one end of the lever 618 by the pivot 620 and is positively and fixedly secured to the outer end of the die segment 508 or 510, as the case may be. The cylinder 602 is pivotally mounted at pin 636 by yoke 638 to a support block 640 which is fixedly mounted on the lever plate 584. A member 642, having the construction of member 62 for machine "A" above, is embodied in the clamp housing 616.

As shown in Figs. 16, 17, 18 and 19, the metal band 700, which is initially a substantially straight semi-formed strip, having the cross-sectional contour shown in Fig. 19, is laid upon the ends of the die segments 508 and 510, ready for closing of the clamping bar 626. A transverse embossment 630 is provided on the end portion of the die segment in direct contact with the metal band 700. A complementary recess 632 is provided in the clamping bar or anvil 626.

The hydraulic system 532 of machine "B," shown diagrammatically in Fig. 20, is substantially identical with that shown for and used on machine "A," and comprises a motor 702 driving a pump 704 which feeds hydraulic fluid, preferably oil, through a pressure regulator valve 706, a check valve 708 to a four way valve 710 whose component units are designed to pass fluid to the control valve 548, mounted on top of cylinder 534, and through this valve to the cylinder 534. Valve 710 also passes hydraulic fluid to the clamping cylinders 602 which operate the clamping mechanisms 516 and 518. A fluid supply tank 714 is provided at the base of the machine "B" for use with pump 704 and for the discharge of exhaust fluid from the valve 710.

The control lever mechanism being identical with that shown for machine "A," the bend machine "B" is operated by starting the motor 702 by a similar switch 34 and moving a similar control lever 32 forwardly at the left to close the clamping mechanisms 516 and 518. The control valve 710 operates to pass fluid to the clamping cylinders 602 to open and close the clamping mechanisms 516 and 518, upon forward or rearward movement of the control lever 32. When the control lever 32 is pivoted to the right, the valve 710 passes fluid to the control valve 548 which in turn passes it to the master cylinder 534, forcing piston rod 542 forward.

As piston rod 542 moves forwardly, the die lever plates 584 are rotated by the linkage 556, 555, 554 and 552 about their pivot bearings 558 until the inner ends of the die segments 508 and 510 come forward to a contiguous closed alignment as shown in Fig. 17.

The semi-formed straight metal band 700 is placed on the ends of the die segments over the embossments 630, just as described above for machine "A," prior to closing the clamps 516 and 518. When the clamps close over the ends of the metal band 700, the embossments 630 and the clamp bar recesses 632 grip the metal band firmly and positively prior to the stretch forming operation.

As the die lever plates 584 rotate on their pivots 558, the metal band is stretched between the ends of the die segments by the die support portions 508 and 510 which swing into closed alignment, Fig. 17, forming the band thereabout. The slide plates 512 and 514 freely slide in the gibs 506 to allow for the stretch forming action of the die segments, as the cams 520 and 522 bear against the table fixed cam followers 528 and 530 respectively. The metal band 700 holds the two die units together.

When the metal band has been stretch formed to the die configuration, the manual control lever 32 is moved rearwardly toward the machine base 500, actuating the control valve 710 to pass hydraulic fluid to the clamping cylinders 602 for reversal of the pistons and consequent opening of the clamping mechanisms 516 and 518. The completely stretch formed band 700 is then manually removed from the die segments 508 and 510.

To return the die units to their initial starting position, the manual control lever 32 is pivoted to the left and the control valve 710 passes hydraulic fluid to the master cylinder 534 reversing the movement of the piston rod 542, retracting it into the cylinder and swinging the inner ends of the die segments rearwardly toward the initial starting position shown in Fig. 16.

To avoid inertial uncontrolled movement past the desired starting point, the block member 546, fixedly mounted on the piston rod 542, makes engaging contact with the valve rod 550 to open valve 548 and release fluid to the master cylinder 534 whereby the piston therein comes to a positive stop. In this way, the back sweep of the die segments does not override the initial starting position of the machine.

The die segments 18 and 20, of machine "A," and 508 and 510, of machine "B," are easily replaceable for the production of new and different metal band sizes and shapes, without otherwise modifying the apparatus. This replacement feature is important from the standpoint of machine adaptability and range.

It will be noted that the machines "A" and "B" have common features of construction and function. The freely laterally sliding die unit is common to both machines. The die units are rotatable. The die units are cam controlled in their sweep about their pivot points to positively relate the lateral slide movement to the forward swing and advance of the die segments. This feature is important in that control of the stretch forming of the metal band is not directly dependent upon the curvature and intricacy of the die configuration, but rather is more directly related to the pivoting advance of the die segments in relation to their lateral movement.

It will therefore be understood from the foregoing description that the effective operation of the inventive apparatus heredisclosed is based upon and is dependent upon the cooperative relationship of the die form of the die segments and the cam which actuates the sliding movement of the die support or block. In machine "A," the cam 150 on the left hand non-sliding plate member 148 causes the right hand die slide block 85 to move laterally. The amount of lateral movement is dependent upon the shape or contour of the cam. By varying the contour or shape of the cam, the displacement, elongation and stretch bending of the metal work piece upon the die form is controlled in the sweep of the rotative die segment or die segments upon the straight metal work piece, which flows and stretches itself upon the die form designed for final shaping of the metal band. In a sense, the die form and the cam are complementary elements in the formation of the finished part.

The configuration of the finished part determines whether the inventive apparatus heredisclosed include a rotative die segment or segments. In some cases where a substantially straight section is required, only one die segment need rotate, the other merely sliding laterally, without rotation, against a cam upon the first die support or block.

In addition to the two types of inventive apparati here shown and described in substantial detail, it will be understood by persons skilled in the art to which the invention pertains that other combinations of base-mounted metal stretch bending elements can be assembled to suit the special requirements of specific contoured parts.

Some of these base-mounted combinations include:

A sliding die support with a stationary die segment, and a. A rotating die support and die segment, on a fixed pivot; or
b. A sliding die support and rotating die segment.

A sliding die support with a rotating die segment, and a. A stationary die support and a stationary die segment; or
b. A stationary die support and a rotating die segment; or
c. A sliding die support and a rotating die segment.

It is to be understood that the term "stationary" as used herein means and represents a "non-rotating" or "non-sliding" element, as the case may be.

Although the preferred means for driving the apparati here disclosed is an oil hydraulic system, it will be understood that other fluids, such as air or other gas, water, etc. may also be employed. Further, the drive means may be mechanical in nature, including gearing, levers, etc. If mechanical drive means are used suitable limit switches and electric brakes on the motor drive can be arranged without difficulty to meet the needs of the apparati. It will easily be understood by persons skilled in the art to which the invention pertains that the drive means may be varied substantially from that shown and described herein.

The metal strip or band used with the apparati here shown and described is preferably longitudinally straight. In cross-section it may be contoured or straight depending upon the requirements of the application. In certain instances, a straight flat metal strip, of rectangular cross-section, may be stretched and bent into a curved form having a contoured cross-section, depending upon the cross-sectional nature of the die forms and the elements of longitudinal curvature in the die forms. The invention is not to be considered as solely limited to a metal strip having a contoured cross-section.

The principal advantages of the construction disclosed reside in the simplicity of the apparatus, the positive control of each stage of its operation, the broad scope in its stretch forming of intricate, complex forms as well as more simple metal forms, and the facile replacement features when die sizes and shapes are changed to produce new product sizes and forms.

Having described the invention in its simplest terms, it is to be clearly understood that the features of construction may be changed and varied in greater or lesser degree without departing from the essence of the invention.

I claim:

1. In apparatus for stretch bending metal strips or bands, a base support, a guided, cam-controlled, laterally slideable die support mechanism mounted on said base support, guide means for said sliding die support mechanism, a die segment, means rotatably mounting said die segment having a metal strip die form thereon on said mechanism, an associated second die support mechanism including a second complementary die segment with die form thereon, means to mount said second complementary die segment for rotatable movement, the inner ends of said die segments being free to swing into and out of alignment, power means to rotatably move at least one of said die segments, releasable clamp means mounted on both said die segments at the outer ends thereof to fixedly hold the ends of said metal strips thereon, cam means on said second mechanism and means associated with and responsive to said cam means on said first mechanism, the power means being operable through said cam means and said cam responsive means to control the movement of said die support mechanisms, said power means swinging at least one of said die segment forms to position its inner end into contiguous alignment with the inner end of the other die segment form, whereby to stretch bend said metal strip about said die forms.

2. In apparatus for stretch bending metal strips or bands, a base support, a guided, cam-controlled, laterally sliding die support mechanism mounted on said base support, guide means for said sliding die support mechanism, a die segment, means rotatably mounting said die segment on said mechanism, a metal strip die form fixedly arranged on said die segment, releasable clamp means mounted on said die support mechanism to fixedly hold one end of said metal strip on said die form at the outer end thereof during the stretch bending operation, means, including a second complementary rotatable die segment with die form, having releasable clamp means to fixedly hold the other end of said metal strip on the outer end of said second die segment form, means to mount said second complementary die segment for rotatable movement, the inner ends of said die segments being free to swing into and out of alignment, power means to rotatably move at least one of said die segments, cam means on at least one of said support mechanism or said means including the second complementary die segment, means associated with and responsive to said cam means, the power means being operable through said cam means and said cam responsive means to control the movement of said die support mechanism, said first die support mechanism being laterally movable and freely slidable in said guide means on said base support, said power means swinging at least one of said die segment forms to position its inner end into contiguous alignment with the inner end of the other die segment form, bringing said die segment forms into full alignment so as to stretch and bend said metal strip fully about said die forms.

3. In apparatus for stretch bending metal strips or bands, a base support, a guided, cam-controlled, laterally sliding die support mechanism mounted on said base support, guide means for said sliding die support mechanism, a die segment, means for rotatably mounting said die segment on said mechanism to swing its inner end in an arcuate path from a position rearwardly of the center of rotation to a position forwardly of the center of rotation, a metal strip die form fixedly arranged on said die segment on the forward face thereof, releasable clamp means mounted on said die support mechanism to fixedly hold one end of said metal strip on said die form adjacent the outer end thereof during the stretch bending operation, means, including a second complementary rotatable die segment with die form, having releasable clamp means to fixedly hold the other end of said metal strip on the outer end of said second die segment form, means to mount said second complementary die segment for rotatable movement, the inner ends of said die segments being free to swing into and out of alignment, power means to rotatably move at least one of said die segments, cam means on at least one of said die support mechanism or said means including the second complementary die segment, means associated with and responsive to said cam means, the power means being operable through said cam means and said cam responsive means to control the movement of said die support mechanism, said first die support mechanism being laterally movable and freely slidable in said guide means on said base support, said power means swinging at least one of said die segment forms to position its inner end into contiguous alignment with the inner end of the other die segment form, bringing said die segment forms into full alignment so as to stretch and bend said metal strip fully about said die forms.

4. In apparatus for stretch bending metal strips or bands, a base support, a guided, cam-controlled, laterally sliding die support mechanism mounted on said base support, guide means for said sliding die support mechanism, a die segment, means for rotatably and pivotally mounting said die segment adjacent its outer end on said mechanism to swing its inner end in an arcuate path from a position rearwardly of the center of rotation to a position forwardly of the center of rotation, a die form for said metal strip fixedly arranged on said die segment on the forward face thereof, releasable clamp means mounted on said die support mechanism to fixedly hold one end of said metal strip on said die form adjacent the outer end thereof during the stretch bending operation, means, including a second complementary rotatable pivoted die segment with die form, having releasable clamp means to fixedly hold the other outer end of said metal strip on the outer end of said second die segment form, means to mount said second complementary die segment for rotatable movement, the inner ends of said die segments being free to swing into and out of alignment, power means to rotatably move at least one of said die segments, cam means on at least one of said die support mechanism or said means including the second complementary die segment, means associated with and responsive to said cam means, the power means being operable through said cam means and said cam responsive means to control the movement of said die support mechanism, said first die support mechanism being laterally movable and freely slidable in said guide means on said base support, said power means swinging at least one of said die segment forms to position its inner end into contiguous alignment with the inner end of the other die segment to bring said die forms into full alignment so as to stretch and bend said metal strip fully about said die forms.

5. In apparatus for stretch bending metal strips or bands, a base support, a guided cam controlled, laterally movable die support mechanism sliding mounted on said base support, guide means for said sliding die support mechanism, a die segment having a metal strip die form thereon, means rotatably and pivotally mounting said die segment intermediate its ends on said mechanism, releasable clamp means mounted on said die support mechanism and conjoined to said die segment to fixedly hold one end of said metal strip on said die segment at the outer end thereof, a second complementary die support mechanism pivotally mounted on said base support adjacent said first mechanism, said second mechanism having a die segment with die form thereon complementary with said first die segment and die form, means to mount said second complementary die segment for rotatable movement, the inner ends of said die segments being free to swing into and out of alignment, power means to rotatably move at least one of said die segments, releasable clamp means mounted on said second mechanism and conjoined to said die segment thereon to fixedly hold the other end of said metal strip on said die segment at the outer end thereof, cam means on said second mechanism in contiguous contact with cam responsive means on said first mechanism to laterally shift said first mechanism as said second mechanism rotates on its pivot, the power means being operable through said cam means and said cam responsive means to control the movement of said first die support mechanism, said power means swinging said die segment forms to position their inner ends into contiguous alignment so as to stretch and bend said metal strip fully about and upon said die forms.

6. In apparatus for stretch bending metal strips or bands, a base support, a rotatable die support mechanism pivotally mounted on said base support having a die segment with a metal strip die form thereon, means rotatably mounting said die segment on said mechanism, releasable clamp means mounted on said mechanism and conjoined to said die segment to fixedly hold one end of said metal strip on said die form at the outer end thereof, power drive means mounted on said base support conjoined to said mechanism to rotate the same, a laterally movable second die support mechanism slidingly mounted on said base support adjacent said first mechanism, guide means for said second die support mechanism, cam means on said first mechanism in contiguous contact with cam responsive means on said second mechanism to move said second mechanism laterally as said first mechanism rotates, said second mechanism having a die segment with die form thereon complementary with said first die segment and die form, means to mount said second complementary die segment intermediate its ends on said second mechanism for rotatable movement, the inner ends of said die segments being free to swing into and out of alignment, releasable clamp means mounted on said second mechanism and conjoined to said second die segment to fixedly hold the other end of said metal strip on said die form at the outer end thereof, said power drive means being operable through said cam means to control the movement of said second die support mechanism, said power drive means swinging the inner ends of said die segment forms in arcuate paths to position said ends into contiguous alignment so as to stretch and bend said metal strip fully about and upon said die forms.

7. In apparatus for stretch bending metal strips or bands, a base support, a die support mechanism pivotally mounted on said base support so as to rotate in a horizontal plane and having a die segment with a metal strip die form thereon, means pivotally and rotatably mounting said die segment on said mechanism so as to swing said die segment in a vertical plane, releasable clamp means mounted on said mechanism and conjoined to said die segment to fixedly hold one end of said metal strip on said die form at the outer end thereof, power drive means associated with and conjoined to said mechanism to rotatably move the same, a laterally movable second die support mechanism slidingly mounted on said base support adjacent said first mechanism and having a rotatable die segment with die form complementary with said first die segment and die form and pivotally mounted on said second mechanism so as to swing in a substantially horizontal plane, guide means for said sliding second die support mechanism, cam means on said first mechanism in contiguous contact with cam responsive means on said second mechanism to move the latter laterally as said first mechanism rotates, means to mount said second complementary die segment for rotatable movement, the inner ends of said die segments being free to swing into and out of alignment, said power drive means being operable through said cam means to control the movement of said second die support mechanism, releasable clamp means mounted on said second mechanism and conjoined to said second die segment to fixedly hold the other end of said metal strip on said die form at the outer end thereof, said power drive means swinging the inner ends of said die segment forms in arcuate paths to position said ends into contiguous alignment so as to stretch and bend said metal strip fully about and upon said die forms.

8. In apparatus for stretch bending metal strips or bands, a base support, a die support mechanism vertically pivotally mounted on said base support so as to rotate in a horizontal plane and having a die segment with a metal strip die form thereon, means horizontally pivotally mounting said die segment on said mechanism so as to swing said die segment in a vertical plane, vertical cam means mounted on said base support and cam follower means mounted on said die segment intermediate the outer end thereof and its horizontal pivoting axis, releasable clamp means mounted on said mechanism and conjoined to said die segment to fixedly grip one end of said metal strip on said die form at the outer end thereof, power drive means associated with and conjoined to said mechanism to rotatably move the same on its vertical axis whereby said die segment is caused to pivot on its horizontal axis in a vertical path defined by said cam means as said cam follower means bears upon said base supported cam means, a guided, cam-controlled, laterally slidable second die support mechanism mounted on said base support adjacent said first mechanism and having a rotatable die segment with die form complementary with said first die segment and die form and pivotally mounted on said second mechanism so as to swing in a substantially horizontal plane, guide means for said sliding second die support mechanism, cam means on said first mechanism in contiguous contact with cam follower means adjustably mounted on said second mechanism responsive to said cam means to move said second mechanism laterally as said first mechanism rotates, means to mount said second complementary die segment for rotatable movement, the inner ends of said die segments being free to swing into and out of alignment, said power drive means being operable through said cam means to control the movement of said second die support mechanism, releasable clamp means mounted on said second mechanism and conjoined to said second die segment to fixedly hold the other end of said metal strip on said die form at the outer end thereof, said power drive means swinging the inner end of said first die segment form in an arcuate path into contiguous alignment with the inner end of said second die segment form, said inner ends moving together into a predetermined final position wherein both said die forms are in alignment so as to stretch and bend said metal strip fully about and upon said die forms.

9. In apparatus for stretch bending metal strips or bands, a base support, a horizontally rotatable die support mechanism pivotally mounted on said base support, said mechanism having a vertically rotatable die segment with metal strip die form thereon, means rotatably mounting said die segment on said mechanism, means moving said die segment in a vertical path as said mechanism rotates horizontally, clamp means conjoined to the outer end of said die segment to releasably grip and hold said metal strip on said die form adjacent the outer end thereof, power drive means associated with and conjoined to said mechanism to rotatably move the same, a laterally slidable second die support mechanism mounted on said base support adjacent said first mechanism and having a substantially horizontally rotatable die segment with die form complementary with said first die segment and die form, means on said second mechanism responsively associated with cam means on said first mechanism whereby said second mechanism is laterally slidable upon rotation of said first mechanism, guide means for said sliding second die support mechanism, means to mount said second complementary die segment for rotatable movement, the inner ends of said die segments being free to swing into and out of alignment, said power drive means being operable through said cam means to control the movement of said second die support mechanism, clamp means conjoined to the outer end of said second die segment to releasably grip and hold said metal strip on said second die form adjacent the outer end thereof, said power drive means swinging the inner end of said first die segment form in an arcuate path into contiguous alignment with the inner end of said second die segment form, said inner ends moving together to a predetermined final position wherein both said die forms are in full alignment so as to stretch and bend said metal strip fully about and upon said die forms.

10. In apparatus for stretch bending metal strips or bands, a base support, a pair of complementary, cam controlled, laterally movable, aligned die support mounts slidingly arranged on said base support, guide means for each of said sliding die support mounts, each of said mounts having a die segment with metal strip die form thereon affixed to a plate member horizontally rotatably mounted on said sliding mount, clamp means conjoined to the outer end of each die segment to releasably grip and hold said metal strip on said die forms adjacent the outer ends thereof, means to mount said die segments for rotatable movement, the inner ends of said die segments being free to swing into and out of alignment, cam means on each of said plate members rotatable therewith and means on said base support associatedly responsive to said cam means to laterally move said mounts in said guide means, and power drive means conjoined to said plate members rotatably moving said die segments and swinging the inner ends of said die segments in arcuate paths into contiguous alignment to a predetermined final position so as to stretch and bend said metal strip fully about and upon said die forms, said power drive means being operable through said cam means to control the movement of said die support mounts.

11. In apparatus for stretch bending metal strips or bands, a base support, a pair of complementary, cam controlled, laterally movable, aligned die support mounts slidingly arranged on said base support, guide means for each of said sliding die support mounts, each of said mounts having a horizontally rotatable plate member vertically pivoted on said mount and having a die segment with metal strip die form thereon fixedly attached thereto, means to mount said die segments for rotatable movement, the inner ends of said die segments being free to swing into and out of alignment, clamp means mounted on each of said plate members and conjoined to the outer end of each die segment to releasably grip and hold said metal strip on said die form adjacent the outer end thereof, cam means on each of said plate members rotatable therewith and means on said base support associatedly responsive to said cam means to laterally move said mounts in said guide means, and power drive means mounted on said base support conjoined to said plate members at the inner ends thereof to rotate the same on their pivots simultaneously and rotatably moving said die segments and swinging the inner ends of said die segments into contiguous alignment with each other to a predetermined position so as to stretch and bend said metal strip fully about and upon said die forms, said power drive means being operable through said cam means to control the movement of said die support mounts.

12. In apparatus for stretch bending metal strips or bands, a base support, a pair of complementary, laterally movable, aligned die support mounts slidingly arranged on said base support, guide means for each of said sliding die support mounts, each of said mounts having a die segment with metal strip die form thereon rotatably supported and pivoted on said mount, means to mount said die segments for rotatable movement, the inner ends of said die segments being free to swing into and out of alignment, clamp means conjoined to the outer end of each die segment to releasably grip and hold said metal strip on said die form adjacent the outer end thereof, cam means on each of said die segments rotatable therewith and means on said base support associatedly responsive to said cam means to laterally move said mounts in said guide means, and power drive means in associated conjunction with said die segments rotatably moving said die segments and swinging the inner ends thereof in arcuate paths into contiguous alignment with each other to a predetermined position so as to stretch and bend said metal strip fully about and upon said die forms, said power means being operable through said cam means to control the movement of said die support mounts.

13. In apparatus for stretch bending metal strips or bands, a base support, a guided, cam controlled, laterally slidable die support mechanism mounted on said base support, guide means for said sliding die support mechanism, a die segment having a metal strip die form thereon, means fixedly mounting said die segment on said mechanism, an associated die support mechanism, including a second complementary die segment with die form thereon, means rotatably mounting said associated mechanism on said base support, means to mount said second complementary die segment for rotatable movement, the inner end of said second die segment being free to swing into and out of alignment with the inner end of said first die segment, power means to rotatably move said second die segment, cam means on said second mechanism in operative engagement with said first mechanism, said power means being operable through said cam means to control the movement of said first mechanism, releasable clamp means mounted on both said die segments at the outer ends thereof to fixedly hold the ends of said metal strips thereon during stretch bending of said metal strip upon said die forms as said first mechanism slides laterally in said guide means and said second mechanism rotates on said base support, said power means swinging said second die segment form to position its inner end into contiguous alignment with the inner end of said first die segment form.

14. In apparatus for stretch bending metal strips or bands, a base support, a guided, cam controlled, laterally slidable die support mechanism mounted on said base support, guide means for said sliding die support mechanism, a die segment having a metal strip die form thereon, means fixedly mounting said die segment on said mechanism, an associated, guided, laterally slidable, base-mounted die support mechanism, including a complementary second die segment with die form rotatably mounted thereon, guide means for said second die support mechanism, means rotatably mounting said second die segment on said second mechanism, the inner end of said second die segment being free to swing into and out of alignment with the inner end of said first die segment, power means to rotatably move said second die segment, cam means on said second mechanism in operative engagement with said first mechanism, said power means being operable through said cam means to control the movement of said first mechanism, said power means swinging said second die segment form to position its inner end into contiguous alignment with the inner end of said first die segment form, and releasable clamp means mounted on both said die segments at the outer ends thereof to fixedly hold the ends of said metal strips thereon during stretch bending of said metal strip upon said die forms as said first mechanism slides laterally in its guide means and said second mechanism slides laterally in its guide means and rotates.

15. In apparatus for stretch bending metal strips or bands, a base support, a guided, cam controlled, laterally slidable die support mechanism mounted on said base support, guide means for said sliding die support mechanism, a die segment having a metal strip die form thereon, means rotatably mounting said die segment on said mechanism, an associated die support mechanism, including a fixedly positioned complementary second die segment with die form thereon, fixedly mounted on said base support, cam follower means mounted on said base support, cam means on said first mechanism in operative engagement with said cam follower means, the inner end of said first die segment being free to swing into and out of alignment with the inner end of said second die segment, power means to rotatably move said first die segment form, said power means being operable through said cam means to control the movement of said first die support mechanism, and releasable clamp means mounted on both said die segments at the outer ends thereof to fixedly hold the ends of said metal strip thereon, said power means swinging said first die segment form to position its inner end into contiguous alignment with the inner end of said second die segment form, as said first mechanism slides laterally in said guide means and rotates and said die segments are brought into alignment with each other so as to stretch bend said metal strip fully about and upon said die forms.

16. In apparatus for stretch bending metal strips or bands, a base support, a guided, cam controlled, laterally slidable die support mechanism mounted on said base support, guide means for said sliding die support mechanism, a die segment having a metal strip die form thereon, means rotatably mounting said die segment on said mechanism, an associated die support mechanism, including a complementary second die segment with die form rotatably mounted thereon, fixedly mounted on said base support, means to mount said second complementary die segment for rotatable movement, cam follower means mounted on said base support, cam means on said first mechanism in operative engagement with said cam follower means to laterally move said first mechanism upon rotative movement of said cam means, the inner ends of said die segments being free to swing into and out of alignment, power means to rotatably move at least one of said die segments, said power means being operable through said cam means to control the movement of said first die support mechanism, and releasable clamp means mounted on both said die segments at the outer ends thereof to fixedly hold the ends of said metal strip thereon, said power means swinging said first die segment form to position its inner end into contiguous alignment with the inner end of said second die segment form, as said first mechanism slides laterally in said guide means and rotates, and said second die segment rotates, and said die segments rotate into alignment with each other to stretch bend said metal strip fully about and upon said die forms.

17. In apparatus for stretch bending metal strips or bands, a base support, a guided, cam controlled, laterally slidable die support mechanism mounted on said base support, guide means for said sliding die support mechanism, a die segment having a metal strip die form thereon, means rotatably mounting said die segment on said mechanism, an associated, laterally slidable, base-mounted die support mechanism, including a complementary second die segment with die form rotatably mounted thereon, guide means for said associated die support mechanism, means to mount said second complementary die segment for rotatable movement, cam follower means mounted on said base support, independent cam means on said first mechanism and on said second mechanism in operative engagement with said cam follower means to laterally move said mechanisms upon rotative movement of said cam means, the inner ends of said die segments being free to swing into and out of alignment, power means to rotatably move said die segment forms to position their inner ends into contiguous alignment, said power means being operable through said cam means to control the movement of said die support mechanisms, and releasable clamp means mounted on both said die segments at the outer ends thereof to fixedly hold the ends of said metal strip thereon, said power means swinging said die segment forms to position their inner ends in contiguous alignment as said mechanisms rotate and slide laterally in their respective guide means, and said die segments rotate into alignment with each other to stretch bend said meal strip fully about and upon said die forms.

References Cited in the file of this patent
UNITED STATES PATENTS
2,457,483  Martin _____ Dec. 28, 1948